UNITED STATES PATENT OFFICE.

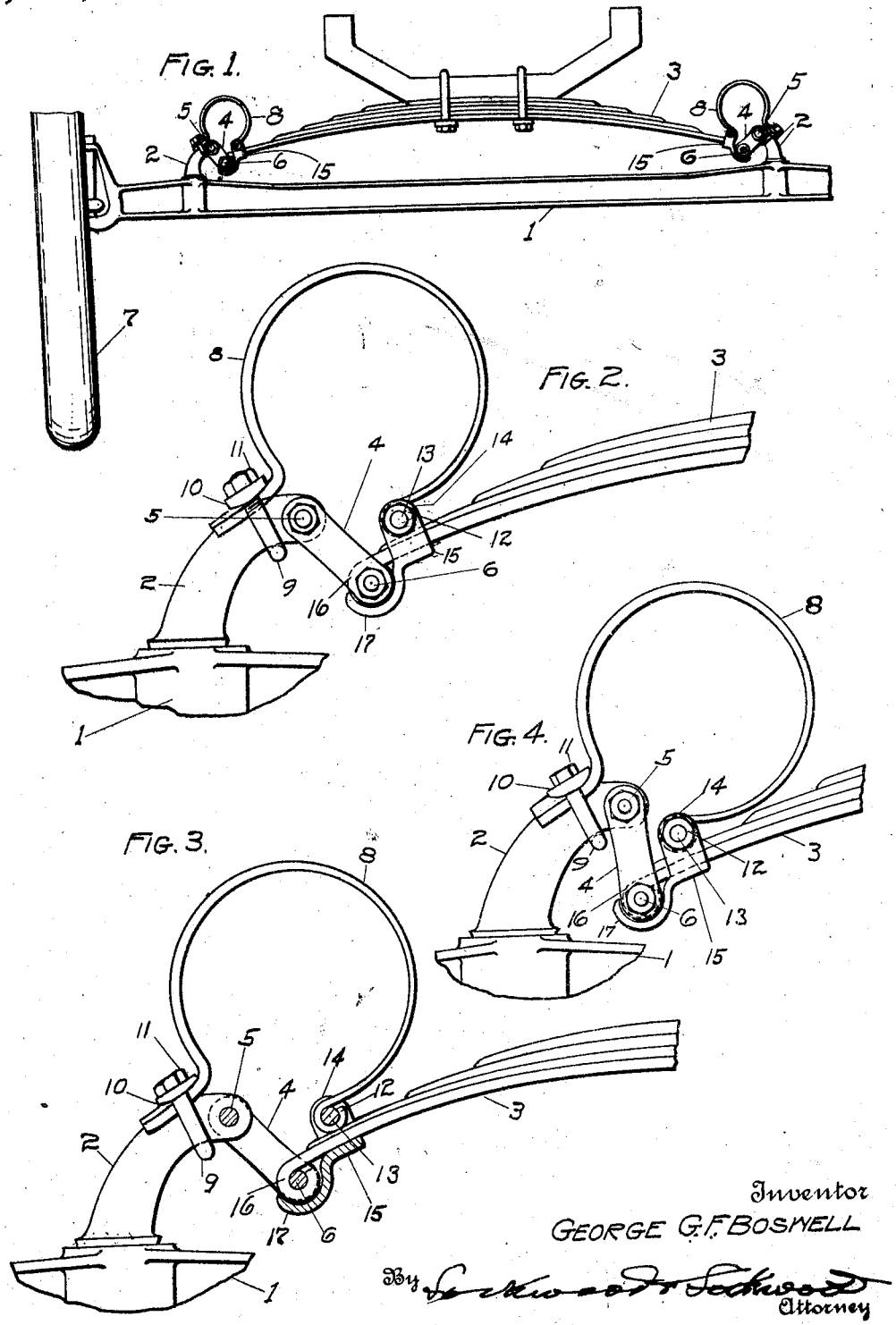

GEORGE G. F. BOSWELL, OF INDIANAPOLIS, INDIANA, ASSIGNOR OF ONE-FOURTH TO NOAH H. ELMORE, ONE-FOURTH TO GEORGE W. INFIELD, AND ONE-FOURTH TO ASA H. BOULDEN, ALL OF INDIANAPOLIS, INDIANA.

SHOCK-ABSORBER.

1,287,850.   Specification of Letters Patent.   Patented Dec. 17, 1918.

Application filed July 12, 1917. Serial No. 180,210.

*To all whom it may concern:*

Be it known that I, GEORGE G. F. BOSWELL, a citizen of the United States, and a resident of Indianapolis, county of Marion, and State of Indiana, have invented a certain new and useful Shock-Absorber; and I do hereby declare that the following is a full, clear, and exact description thereof, reference being had to the accompanying drawings, in which like letters refer to like parts.

My invention relates to new and useful improvements in a combined shock absorber and cushioning means for vehicles and is more particularly adapted for use in connection with a Ford automobile wherein a semi-elliptic spring is used.

My object is to provide a spring construction and attach the same to the springs and supporting brackets therefor, in such a manner that the mechanism will coöperate with the spring and give the same effect to the spring as when a full elliptic spring is used.

A further object is to so construct the device that it can be readily attached to the form of springs and brackets as now manufactured without changing any of the parts thereof.

A further object is to so construct the device that the body of the car will be held against vibration or lateral swinging movement, when the car is at rest and the engine is running.

A further object is to so construct the device that the endwise thrust of the body springs will be cushioned in either direction.

A further object is to so construct the device that any shock delivered to the wheels of the vehicle will be practically absorbed before being transmitted to the body of the car.

Other objects and advantages will be hereinafter more fully set forth and pointed out in the accompanying specification.

The full nature of the invention will be understood from the accompanying drawing and the following description and claims:

Figure 1 is an elevation of the front axle of an automobile showing my improved device attached thereto. Fig. 2 is an enlarged elevation of one end of one body spring and a supporting bracket therefor, showing my improved device in its normal position. Fig. 3 is a vertical sectional view through the shock absorbing device and the hanger connecting the body spring to the bracket. Fig. 4 is a view similar to Fig. 2 showing the position of the parts when the spring of the vehicle is flexed.

1 indicates the axle of the vehicle, which in this instance, is the front axle of a Ford automobile, said axle having the usual form of brackets 2 attached thereto from which are suspended the ends of a spring 3 by means of the links 4 and bolts 5 and 6, which parts are of the usual or well known construction.

In order to cushion any blow delivered to the wheels 7 of the vehicle and to regulate the endwise thrust of the spring 3, I provide a cushioning spring 8 which is substantially circular in form, one end of said spring being attached to the bracket 2 in any preferred manner, as by means of the coupling 9 which extends below the bracket 2 and through a clip 10 extending over the end of the cushioning spring 8, the ends of the coupling 9 being threaded to receive nuts 11 by means of which the clip is clamped on to the end of the cushioning spring and said end held in firm engagement with the bracket.

The opposite end of the cushioning spring 8 is bent into the form of an eye 12, through which extends a bolt 13, said bolt being in turn introduced through the ears 14 of a clevis 15, which clevis is introduced around the end of the body spring 3 in close proximity to the loop 16 at the end of the body spring. In order to hold the coupling 15 against movement longitudinally of the body spring 3, an anchoring tongue 17 is attached to the coupling 15 and preferably formed integral therewith, said anchoring tongue being curved to fit the contour of the loop 16 so that when the coupling 15 is properly positioned upon the body spring 3, said anchoring tongue will engage the loop 16 and partially surround the same. The eye 12 of the cushioning spring is so constructed that it will rest upon the upper face of the body spring, when the same is positioned between the ears 14 and engaged by the bolt 14, and the coupling will be securely held against movement independently of the body spring.

The cushioning spring 8 is preferably constructed of a flat piece of steel of a uniform width but preferably tapered in thickness from the end anchored to the bracket to the end engaged with the body spring and as said cushioning spring is substantially circular in form, any abrupt bends or curvatures, which might cause crystallization of the cushioning spring, will be entirely eliminated.

By constructing the cushioning spring in the manner shown and positioning the same directly over the connecting point between the body spring of the vehicle and its supporting bracket, any movement of the body spring will be readily regulated and any undue movement of the axle of the vehicle and its supporting bracket, as when a blow is delivered to the wheel of the vehicle, will be practically entirely absorbed or assimilated by the cushioning spring before it is transmitted to the body spring.

It will further be seen that in view of the circular construction of the cushioning spring, said spring will have a tendency to lift upwardly on the body spring when said body spring is given an endwise thrust and in consequence of this action, vibration of the car body incident to the vibration of the motor, if left running while the vehicle is at rest, will be entirely eliminated as will also the lateral swaying movement of the body of the car when the car is in action.

The invention claimed is:

1. In combination with the body spring of a vehicle, a supporting bracket, and links pivotally connecting the body spring with the bracket, of a flat cushioning spring of uniform width and diminishing thickness from one end to the other, and means to connect the ends of the cushioning spring to said bracket and body spring respectively.

2. In combination with the body spring of a vehicle, a supporting bracket therefor, and links pivotally connecting the end of the body spring to the end of the bracket, of a flat cushioning spring disposed over the pivotal points between said bracket and body spring and having a diminishing thickness from one end to the other, and means to anchor the ends of the cushioning spring to said bracket and body spring respectively on opposite sides of the pivotal connections between the body spring and bracket.

3. The combination with the body spring of a vehicle, a supporting bracket for the body spring, said spring having swinging pivotal connection with the bracket, of a substantially circular cushioning spring, an eye at one end of the cushioning spring, a coupling, means to pivotally secure the eye to said coupling, means on the coupling for engaging the body spring to prevent independent movement between the coupling and body spring, and means to anchor the opposite end of the cushioning spring to said bracket, the ends of the cushioning spring being disposed on opposite sides of the pivotal connection between the body spring and bracket.

4. The combination with the body spring of a vehicle having a loop, a supporting bracket and links connecting said loop with said bracket, of a cushioning spring, means to anchor one end of the cushioning spring to the bracket, a coupling disposed around the body spring, means to pivotally connect the opposite end of the cushioning spring to the coupling, and an anchoring tongue carried by the coupling adapted to engage the loop of the body spring to hold the coupling against independent movement of the body spring.

5. The combination with a body spring of a vehicle, a supporting bracket therefor, and means to pivotally connect the body spring with the bracket, of a cushioning spring of uniform width and diminishing thickness, said cushioning spring being substantially circular in form and means to anchor the ends of said cushioning spring to said body spring and bracket respectively on opposite sides of the pivotal connection between the body spring and bracket.

In witness whereof, I have hereunto affixed my signature.

GEORGE G. F. BOSWELL.